(12) United States Patent
Eisele et al.

(10) Patent No.: US 11,886,028 B1
(45) Date of Patent: Jan. 30, 2024

(54) ROLLABLE RIBBON SEPARATOR

(71) Applicant: Hubbell Power Systems, Inc., Shelton, CT (US)

(72) Inventors: Will Eisele, Cromwell, CT (US); Brian Bourgoin, Cromwell, CT (US)

(73) Assignee: Hubbell Power Systems, INC., Shelton, CT (US)

( * ) Notice: Subject to any disclaimer, the term of this patent is extended or adjusted under 35 U.S.C. 154(b) by 0 days.

(21) Appl. No.: 17/492,123

(22) Filed: Oct. 1, 2021

Related U.S. Application Data

(60) Provisional application No. 63/086,381, filed on Oct. 1, 2020.

(51) Int. Cl.
| | | |
|---|---|---|
| *G02B 6/44* | (2006.01) | |
| *G02B 6/25* | (2006.01) | |
| *H02G 1/12* | (2006.01) | |
| *B26D 3/16* | (2006.01) | |
| *G02B 6/46* | (2006.01) | |

(52) U.S. Cl.
CPC ............ *G02B 6/4439* (2013.01); *B26D 3/169* (2013.01); *G02B 6/25* (2013.01); *G02B 6/4471* (2013.01); *G02B 6/564* (2023.05); *H02G 1/1217* (2013.01); *H02G 1/1229* (2013.01)

(58) Field of Classification Search
CPC ........ B26D 3/169; G02B 6/25; G02B 6/4439; G02B 6/4467; G02B 6/4471; H02G 1/1217; H02G 1/1229
See application file for complete search history.

(56) References Cited

U.S. PATENT DOCUMENTS

| | | | | |
|---|---|---|---|---|
| 4,947,549 | A * | 8/1990 | Genovese ............ | G02B 6/4497 81/9.4 |
| 5,093,992 | A * | 3/1992 | Temple, Jr. .......... | G02B 6/4497 30/90.4 |
| 5,524,166 | A * | 6/1996 | Osaka .................. | G02B 6/4498 385/115 |
| 6,053,085 | A * | 4/2000 | Lochkovic ........... | G02B 6/4498 83/590 |
| 6,556,760 | B1 * | 4/2003 | Dellinger ............. | G02B 6/4498 385/134 |
| 6,909,832 | B2 * | 6/2005 | Akiyama ................. | G02B 6/25 385/134 |
| 9,466,956 | B2 * | 10/2016 | Zhang .................... | H02G 1/126 |

(Continued)

*Primary Examiner* — Ryan A Lepisto
(74) *Attorney, Agent, or Firm* — Ruggiero McAllister & McMahon LLC

(57) ABSTRACT

A rollable ribbon separator tool for separating fibers in a rollable ribbon, the rollable ribbon separator including a chassis having a length and a guide surface along the chassis length for receiving a first portion of a rollable ribbon in a flattened position, the guide surface for positioning the first portion of the rollable ribbon having a first node with selected fibers to be separated, the selected fibers being positioned flat on the guide surface. The rollable ribbon separator includes a blade securable to the chassis, the blade having a cutting edge positioned toward the guide surface at an acute angle to the guide surface. The angle of the blade cutting edge with respect to the guide surface allows the cutting edge to urge the first portion of the flattened ribbon fibers against the guide surface when the fibers are drawn through the chassis along the guide surface.

17 Claims, 8 Drawing Sheets

(56) References Cited

U.S. PATENT DOCUMENTS

| | | | |
|---|---|---|---|
| 10,498,118 B2 * | 12/2019 | Lu | G02B 6/245 |
| 2010/0000372 A1 * | 1/2010 | Daggett | H02G 1/1229 |
| | | | 81/9.4 |
| 2018/0095222 A1 * | 4/2018 | Scirbona | H02G 1/1217 |

* cited by examiner

ROLLABLE RIBBON SEPARATOR

RELATED APPLICATION

The present application claims priority to provisional patent application Ser. No. 63/068,381, the provisional application being herby incorporated by reference.

BACKGROUND OF THE INVENTION

1. Field of the Invention

The present invention relates to a tool used for separating fibers in a rollable ribbon cable.

2. Description of Related Art

Fiber optic cables continue to evolve to maximize density of individual fibers within a cable package. Many manufacturers have utilized high density ribbon cables. Ribbon fibers were initially introduced as a flat matrix layout of 12 or more fibers arrayed in a flat strip. When these sub-units were grouped in a high-density cable package, there was a lot of airgap and the cable diameter was larger. Rollable ribbon technology has been introduced to allow the fibers to group in a circular matrix, reducing airgap and allowing for more dense packaging.

Traditional flat ribbon 90 was laid side by side and adhesive was applied to keep them in a flat position. The design of rollable ribbon 90' is highly proprietary between different manufacturers. The geometry of the matrix, adhesive application and composition varies between fiber manufactures. One example is shown in FIGS. 23-25. In general, most manufacturers apply adhesive to the rollable ribbon to create a series of nodes 30 and voids 40 to allow the technician to separate fibers as needed to perform splicing and connectorization of the fiber in the field.

The adhesive strength at the nodes is also an industry-wide variable and proprietary feature. Some manufacturers intentionally use a weak bond so the installer can separate the node by hand/finger. These configurations are delicate and require great care since the nodes can accidentally separate through handling of the ribbon matrix. Other manufacturers use a more aggressive bond so the rollable matrix will retain its configuration and not separate as a technician handles the fiber. This approach results in a more robust configuration, but the fiber will be damaged if an installer tries to separate the nodes by hand. The adhesive bond is aggressive to the point it will pull the outer coating layer of the Fiber (200 or 250 micron) away from the 125 micron cladding, creating unacceptable damage.

SUMMARY OF THE INVENTION

Bearing in mind the problems and deficiencies of the prior art, it is therefore an object of the present invention to provide a tool which creates a controlled method to load and separate the nodes of aggressively bonded fibers without damage.

It is another object of the present invention to provide a tool which utilizes an angled blade and guiding support to allow a user to isolate a node and then separate that node and continue to separate multiples nodes within the selected fibers as needed.

A further object of the invention is to provide a tool for separating aggressively bonded rollable ribbon fibers.

Still other objects and advantages of the invention will in part be obvious and will in part be apparent from the specification.

The above and other objects, which will be apparent to those skilled in the art, are achieved in the present invention which is directed to a rollable ribbon separator tool for separating fibers in a rollable ribbon, the rollable ribbon separator including a chassis having a length and a guide surface along the chassis length for receiving a first portion of a rollable ribbon in a flattened position, the guide surface for positioning the first portion of the rollable ribbon having a first node with selected fibers to be separated, the selected fibers being positioned flat on the guide surface. The rollable ribbon separator includes a blade securable to the chassis, the blade having a cutting edge positioned toward the guide surface at an acute angle to the guide surface. The angle of the blade cutting edge with respect to the guide surface allows the cutting edge to urge the first portion of the flattened ribbon fibers against the guide surface when the fibers are drawn through the chassis along the guide surface. The tool of claim 1 wherein the angle of the blade cutting edge with respect to the guide surface is between 20° and 40°. The angle of the blade cutting edge with respect to the guide surface may alternately be between 5° and 55°. The too may include a blade storage compartment and a handle assembly including a handle, the handle assembly rotatably secured to the chassis wherein the blade storage compartment may store the blade in the blade storage compartment when the blade is not in use and the blade is accessible by rotating the handle away from the chassis. The tool may include a first magnet secured to the chassis and a second magnet secured to the handle assembly wherein the tool is biased in the closed position when the handle is in a first closed position and urging the handle to a second open position allows access to the blade storage compartment. The blade cutting edge may slice the nodes before the remaining portion of the blade separates the selected fibers adjacent the first node when the fibers are drawn through the chassis. The tool may include a blade slot in the chassis for securing the blade in a working position and may include a plurality of blade guide pins for positioning the blade at the desired angle to the guide surface.

Another aspect of the present invention is directed to a method for separating fibers in a rollable ribbon. The method includes providing a rollable ribbon separator including a chassis having a length and a guide surface along the chassis length for receiving a first portion of a rollable ribbon in a flattened position, the guide surface for positioning the first portion of the rollable ribbon having a first node with selected fibers to be separated, the selected fibers being positioned flat on the guide surface and a blade securable to the chassis, the blade having a cutting edge positioned toward the guide surface at an acute angle to the guide surface wherein the angle of the blade cutting edge with respect to the guide surface allows the cutting edge to urge the first portion of the flattened ribbon fibers against the guide surface when the fibers are drawn through the chassis along the guide surface. The method includes providing a rollable ribbon and selecting a first node for separation on the ribbon, the first node having an adjacent void. The method includes widening an adjacent void, draping the adjacent void over the blade and ensuring the first node is in contact with the guide surface. The method includes drawing the ribbon along the tool length until the first node contacts the blade edge and continuing to draw the ribbon along the tool length until the fibers on the first node are separated. The tool may include a blade storage compartment and a handle assembly including a handle, the handle assembly rotatably secured to the chassis wherein the blade storage compartment may store the blade in the blade storage compartment when the blade is not in use and the blade is accessible by rotating the handle away from the chassis and the method may include a step of moving the handle away from the chassis until the stored blade is accessible and removing the blade from a storage compartment if the blade is not in the blade slot on the chassis before the step of selecting a first node for separation on the ribbon, the first node having an adjacent void. The tool may include a first magnet secured to the chassis and a second magnet secured to the handle assembly wherein the tool is biased in the closed position when the handle is in a first closed position and urging the handle to a second open position allows access to the blade storage compartment. The method may include a step of inserting the blade into the blade slot before the step of selecting a first node for separation on the ribbon, the first node having an adjacent void. The guide surface may extend along an upper portion of the chassis in the direction of the blade to form an upper guide surface beyond the blade cutting edge and provide an upper finger clamping region, the tool further including a lower finger clamping region on a lower portion of the chassis opposite the upper finger clamping region, and the steps may include a user's fingers grasping the upper and lower finger clamping regions and holding the ribbon in the flattened position against the guide surface while drawing the ribbon through the blade cutting edge. The angle of the blade cutting edge with respect to the guide surface may be between 20° and 40° or may be between 5° and 55°. The tool may include a plurality of blade guide pins for positioning the blade at the desired angle to the guide surface.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-26 of the drawings in which like numerals refer to like features of the invention.

Figures 1, 2, 3:
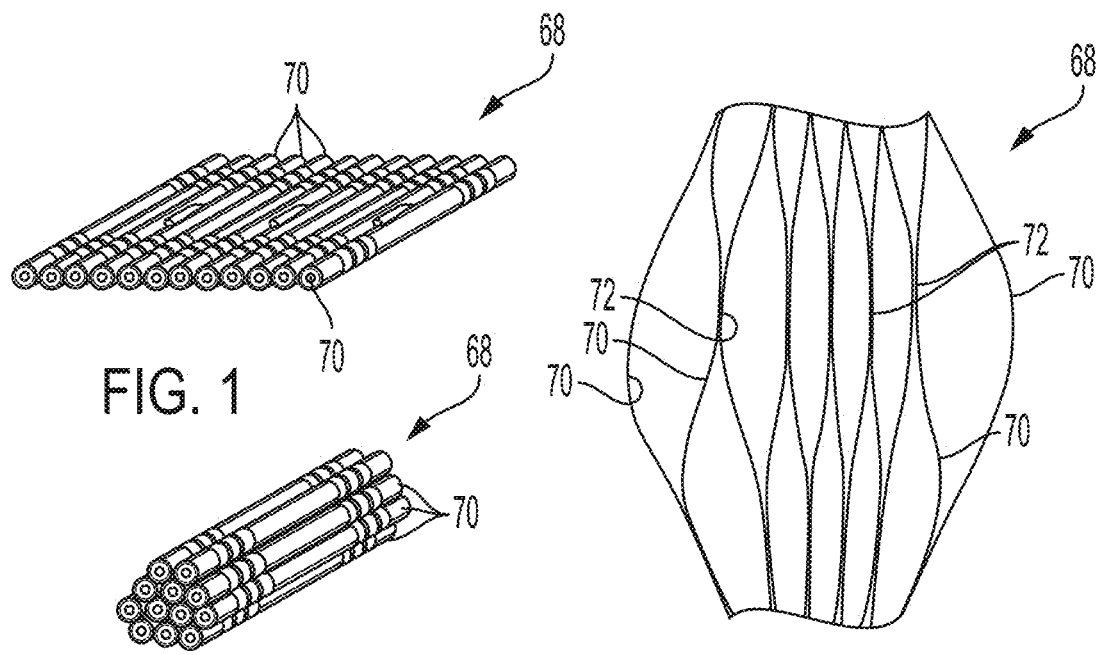
FIG. 1 is a perspective view of a rollable ribbon in a flattened state.
FIG. 2 is a perspective view of a rollable ribbon in a rolled state.
FIG. 3 is a top elevational view of a rollable ribbon in an expanded state.
Figures 4, 5:
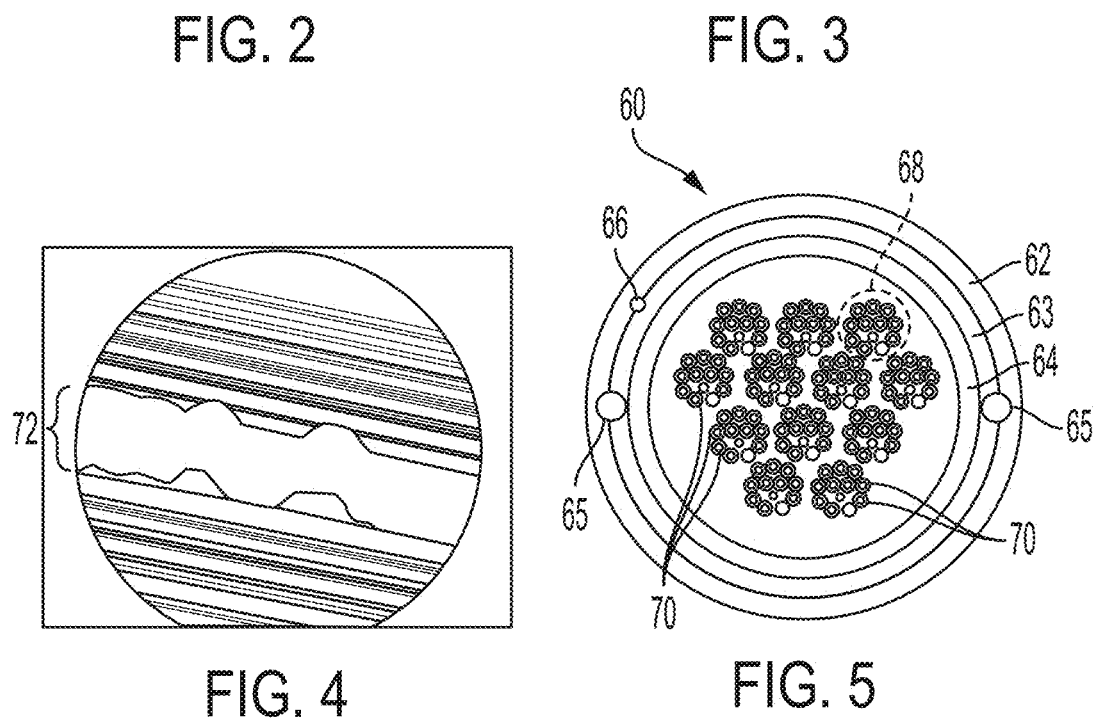
FIG. 4 is a microscopic view of a pair of rollable ribbon fibers which has been damaged during separation.
FIG. 5 is a cross-sectional view of a rollable ribbon cable having a plurality of rollable ribbons.

Rollable ribbon cables come in many configurations in regard to number of fibers in the rollable ribbons, number of rollable ribbons in the cable, number of strands in each fiber, number of layers protecting the rollable ribbons, materials for protective jackets and layers, strengthening members, rip cords, gel preferences and buffer tubes. Other features may additionally be used. One example of a rollable ribbon 68 is shown in the flattened state in FIG. 1 and in the rolled state in FIG. 2. FIG. 3 shows a rollable ribbon 68 which has been expanded to access an individual fiber 70 or fiber pair at the node 72 for processing. FIG. 4 shows a microscopic view of a set of rollable ribbon fibers 70 which have been damaged during separation of the fibers at the node portion where they had been attached during manufacturing. One example of the rollable ribbon cable 60 including a plurality of rollable ribbons 68 is shown in FIG. 5. This example includes 12 rollable ribbons 68, an outer jacket 62, a yarn layer 63, a core tube 64, a strengthening rod 65, and ripcord 66. The present invention is used for separating the fibers 70 in an individual rollable ribbon 68 and is shown in the perspective views of FIGS. 6 and 7. Each rollable ribbon 68 includes a plurality of individual fibers 70 which are partially bonded to each other at intermittent points or nodes 72. Each of the fibers 70 may include a cluster of fiber strands 170 (FIG. 26), each capable of carrying a signal. The outer jacket 62 may be plenum rated for special applications or may be of other materials used in fiber optic cable construction. The rollable ribbon separator 10 as described in this application may be used on any rollable ribbon cable that includes at least the rollable ribbons 68.

Figure 6:
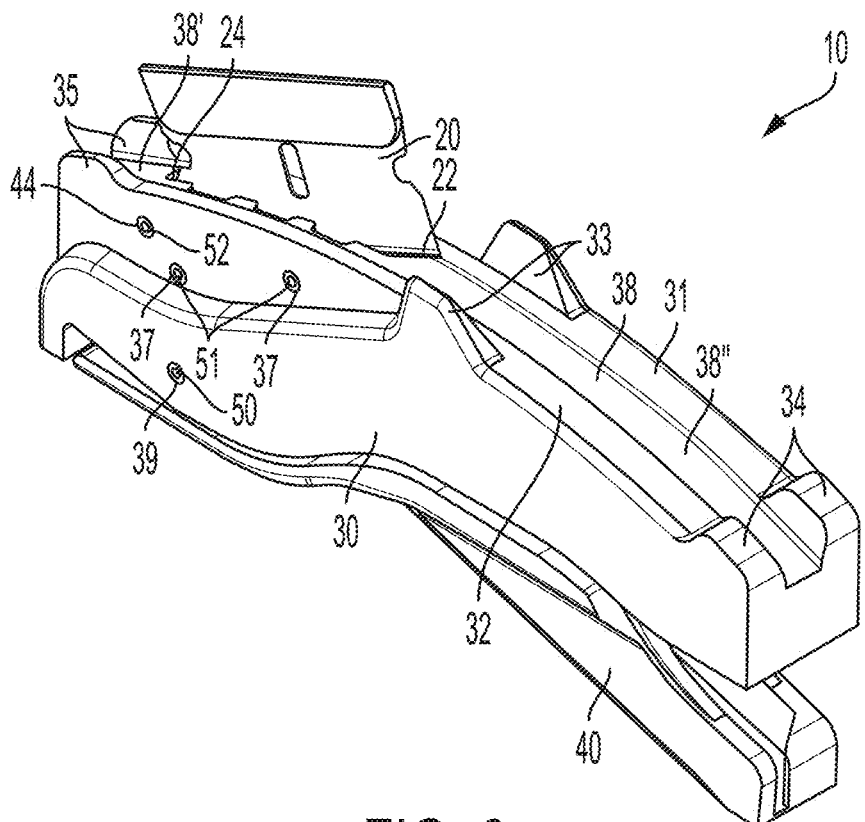
FIG. 6 is a rear right top perspective view of the rollable ribbon separator according the present invention.
Figure 7:
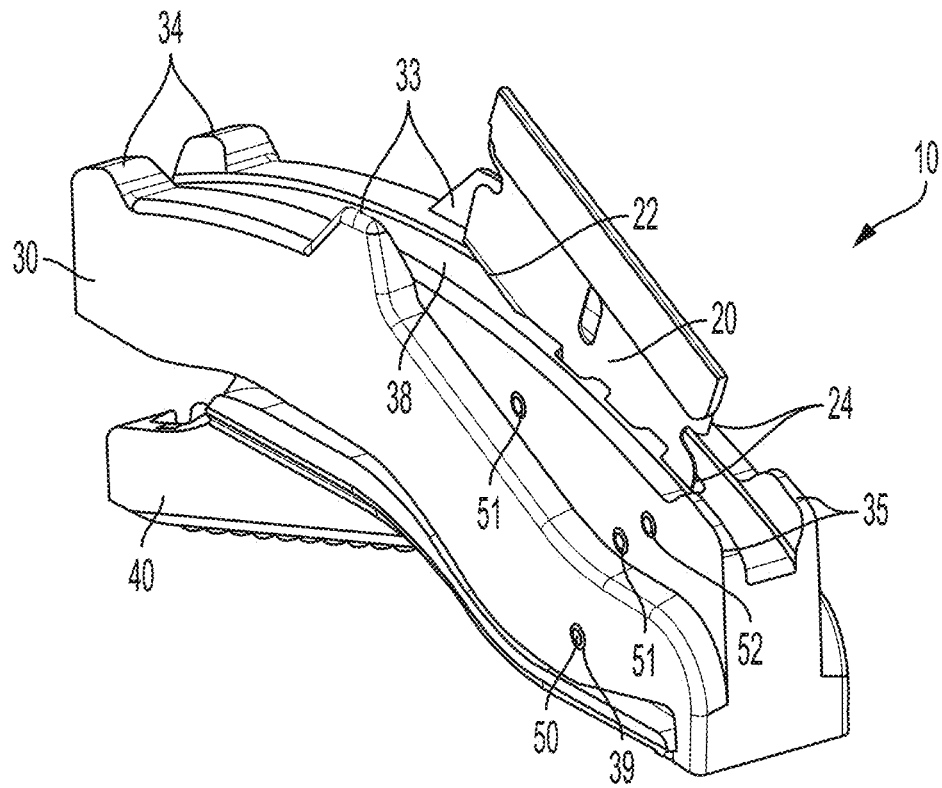
FIG. 7 is a front left top perspective view of the rollable ribbon separator shown in FIG. 6.
Figure 8:
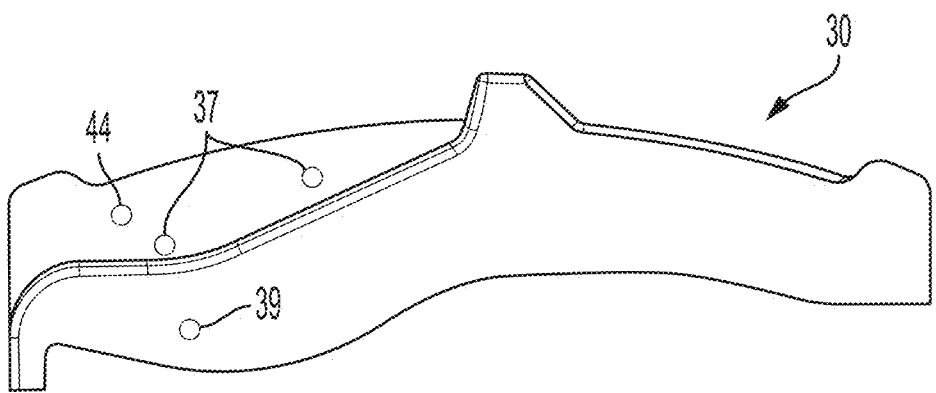
FIG. 8 is a left side elevational view of the chassis according to the present invention.
Figure 9:
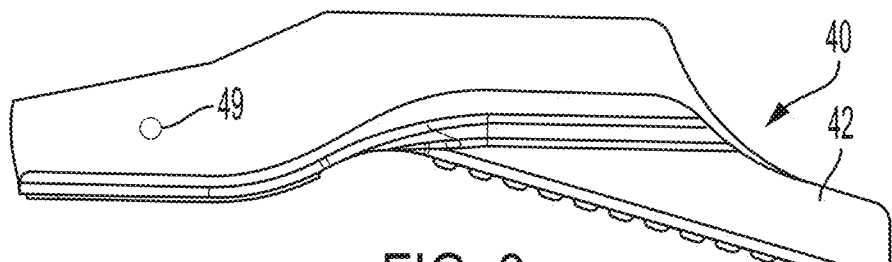
FIG. 9 is a left elevational view of the handle according to the present invention.
Figure 10:
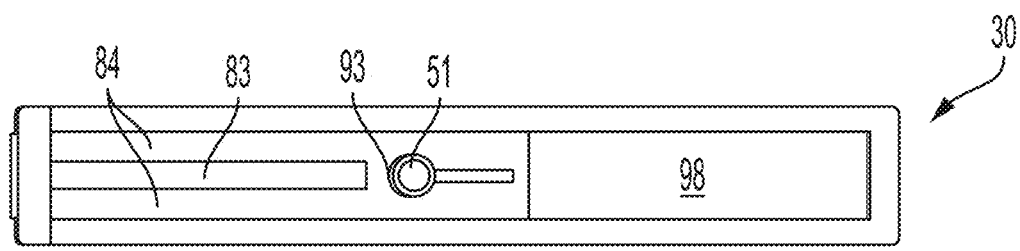
FIG. 10 is a bottom plan view of the chassis shown in FIG. 8.
Figure 11:
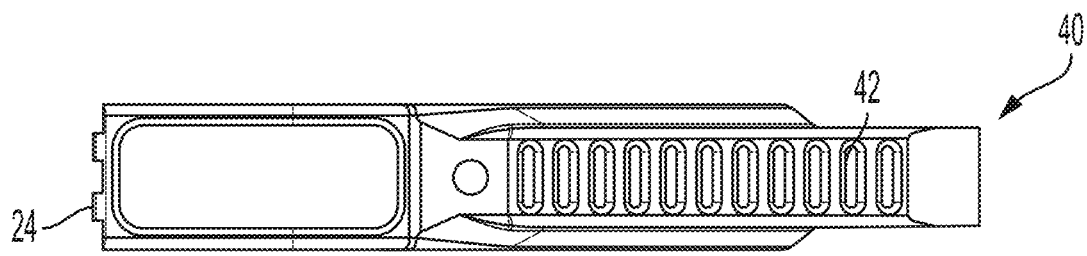
FIG. 11 is a bottom plan view of the handle shown in FIG. 9
Figure 12:
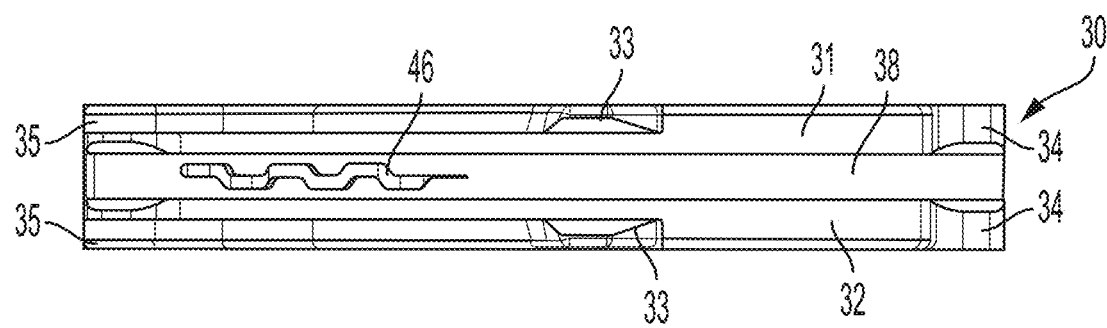
FIG. 12 is a top plan view of the chassis shown in FIG. 8.
Figure 13:
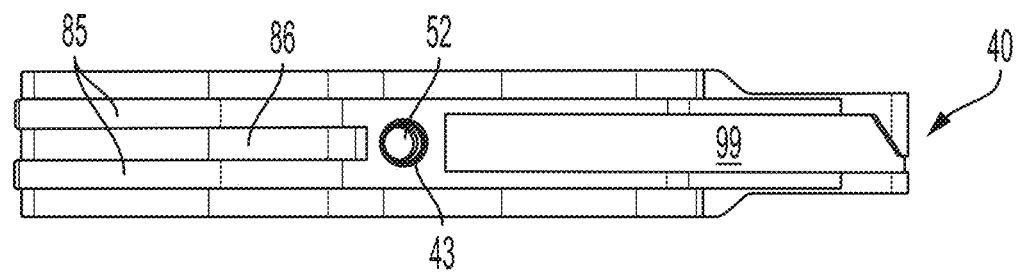
FIG. 13 is a top plan view of the handle shown in FIG. 9
Figure 14:
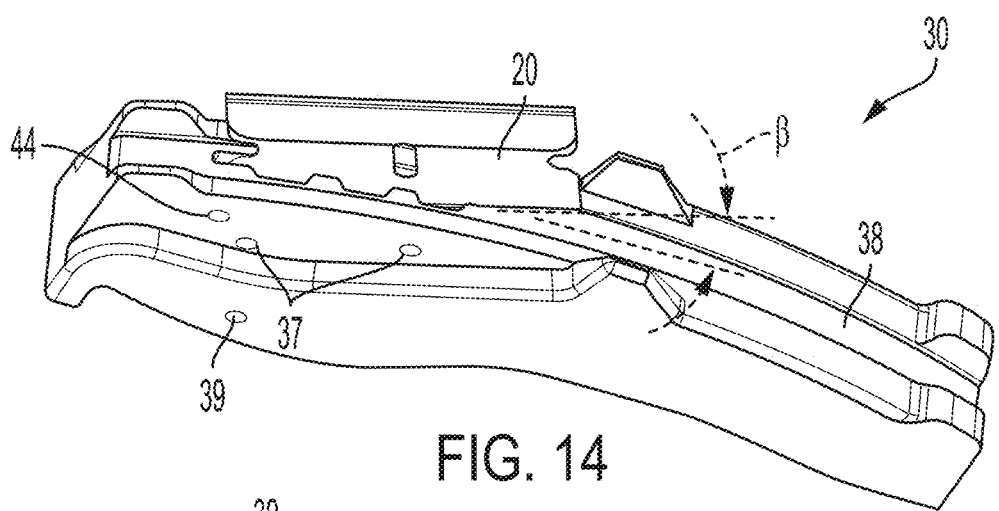
FIG. 14 is a top right front perspective view of the chassis shown in FIG. 8 with the blade positioned for separating fibers in a rollable ribbon.
Figure 15:
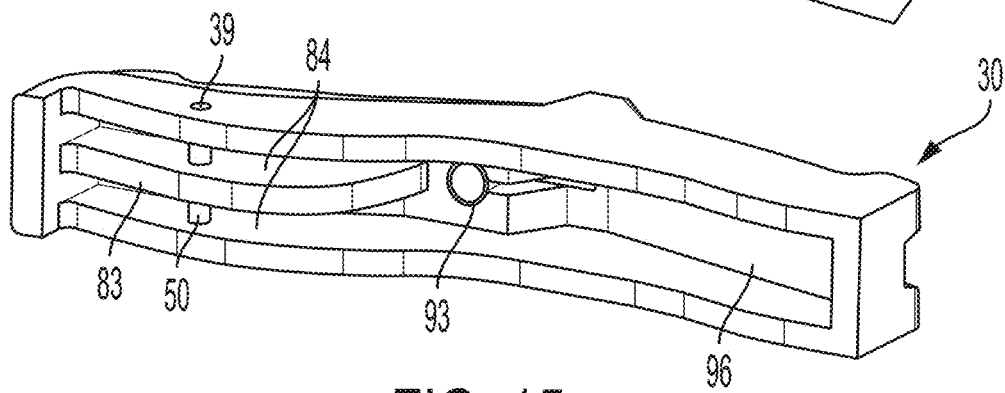
FIG. 15 is a bottom right rear perspective view of the chassis shown in FIG. 8.
Figure 16:
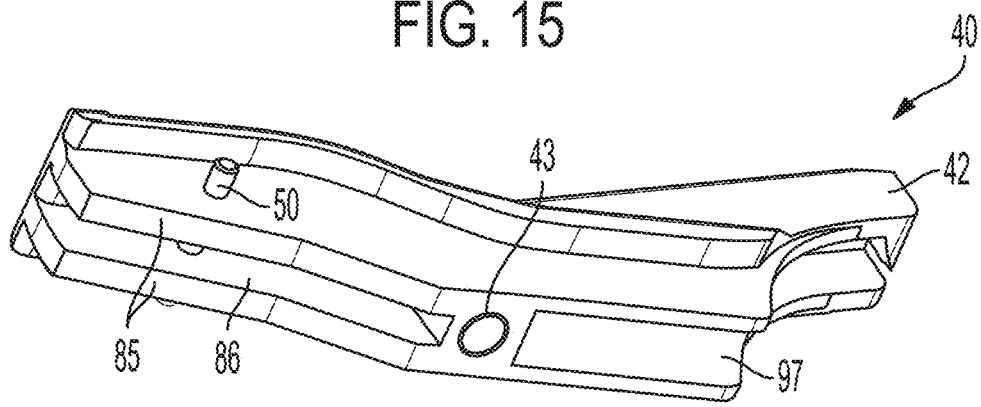
FIG. 16 is a top left front perspective view of the handle shown in FIG. 9.
Figure 17:
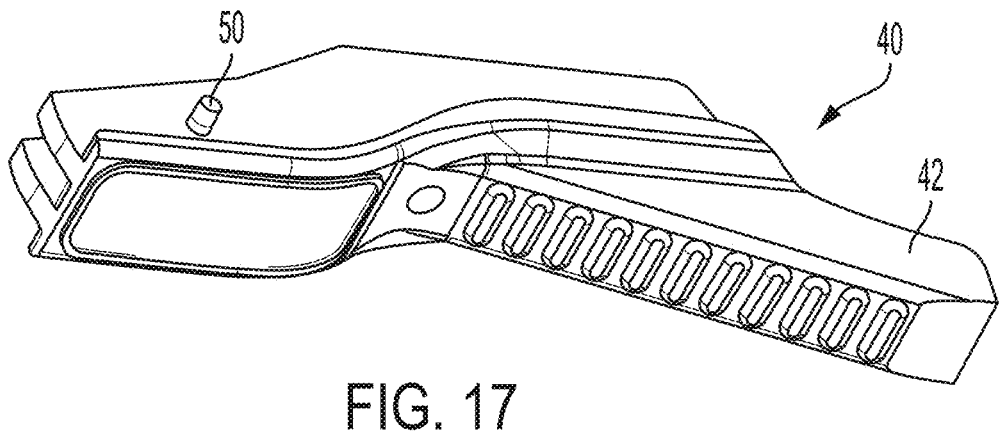
FIG. 17 is a bottom right front perspective view of the handle shown in FIG. 9.

The rollable ribbon separator 10 is shown in the perspective views of FIGS. 6 and 7. Elevational views of the individual components, specifically the tool chassis 30 and the tool handle assembly 40, are shown in FIGS. 8-13 and top and bottom perspective views are shown in FIGS. 14-17. The rollable ribbon separator 10 includes a chassis 30 having a length and a guide surface 38 along the chassis length for receiving a portion of a rollable ribbon 68 in a flattened position, the guide surface 38 for positioning the rollable ribbon for separation. The rollable ribbon 68 includes nodes 72 with portions having fibers not attached to one another between the nodes 72. The fibers selected for separation using the rollable ribbon separator 10 are positionable flat against the guide surface 38. The rollable ribbon separator 10 includes a blade 20 securable to the chassis 30 within a blade slot 46 (FIG. 12), the blade 20 having a cutting edge 22 positioned toward the guide surface 38 at an acute angle β (FIG. 14) to the guide surface 38. The blade 20 includes a front edge 24 substantially perpendicular to the cutting edge 22 although alternate embodiments of the blade may be used that include the front edge having other configurations. The acute angle β of the blade cutting edge 22 with respect to the guide surface 38 allows the cutting edge 22 to urge the ribbon fibers 70 against the guide surface 38 when the ribbon fibers 70 are drawn through the chassis 30 along the guide surface.

A handle assembly 40 includes a handle 42 and a front face 25 on the opposite end of the handle assembly 40 as the handle 42. The handle assembly 40 includes a handle assembly pivot pin opening 49 for receiving a pivot pin 50. The pivot pin 50 extends through chassis pivot opening 39, allowing the handle to rotate about the pivot pin 50 with respect to the chassis A blade storage compartment 96, 97 (FIGS. 15 and 16) includes a chassis storage slot 98 on the bottom of the chassis 30 and a handle storage slot 99 on the top side of the handle assembly 40 which, when the tool is assembled, allows storage of the blade 20 when the rollable ribbon separator 10 is not in use. The compartment 96, 97 may also store spare blades. The handle 22 may be rotated away from the chassis 40 to access the blade 20. A chassis magnet 50 is secured in a chassis magnet opening 93 in the chassis 30 and a corresponding handle magnet 52 is secured in a handle magnet opening 43 in the handle assembly. The chassis magnet 50 and the handle magnet 52 maintain the rollable ribbon separator 10 in the closed position until the handle 22 is urged away from the chassis 30 in order to access or store the blade 20. The chassis 30 includes chassis alignment slots 84 and a chassis alignment protrusion 83 which slidingly engage handle alignment protrusions 85 and handle alignment slot 86, respectively, for ensuring the handle assembly 40 moves in alignment with the chassis when accessing the storage compartment.

The rollable ribbon separator 10 includes guide walls 31, 32 on either side of the guide surface 38 and may include additional protrusions 33, 34, 35 for further guiding the placement of the ribbon fibers 70. The chassis 30 includes lower blade guide pin openings 37 for securing lower blade guide pins 51 to the chassis 30 and front blade guide pin openings 44 for securing the front blade guide pin 52 to the chassis. In the working position, the blade cutting edge 22 contacts the lower blade guide pins 51 and the blade front edge 24 contacts the front blade guide pin 52. The placement of the blade guide pins 51, 52 on the chassis 30 position the blade edge 22 at the desired angle to the guide surface 38.

Figure 18:
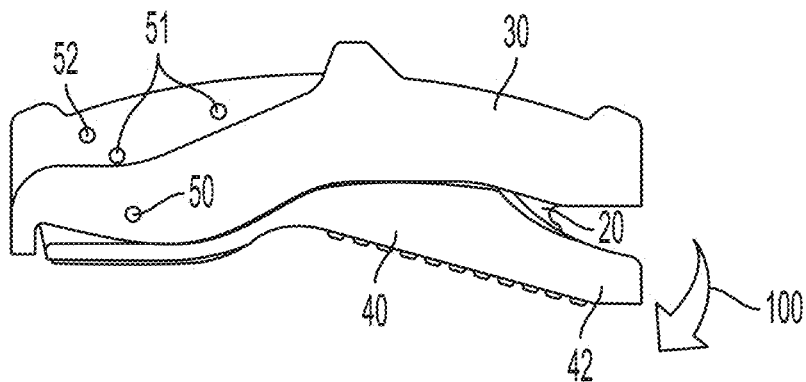
FIG. 18 is a right side elevational view of the rollable ribbon separator being opened to access the blade.
Figure 19:
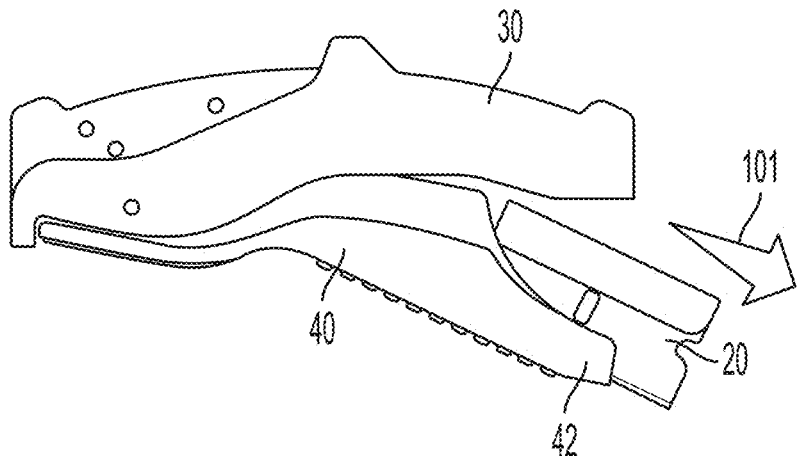
FIG. 19 is a right side elevational view of the blade being released from a storage compartment inside the rollable ribbon separator.
Figure 20:
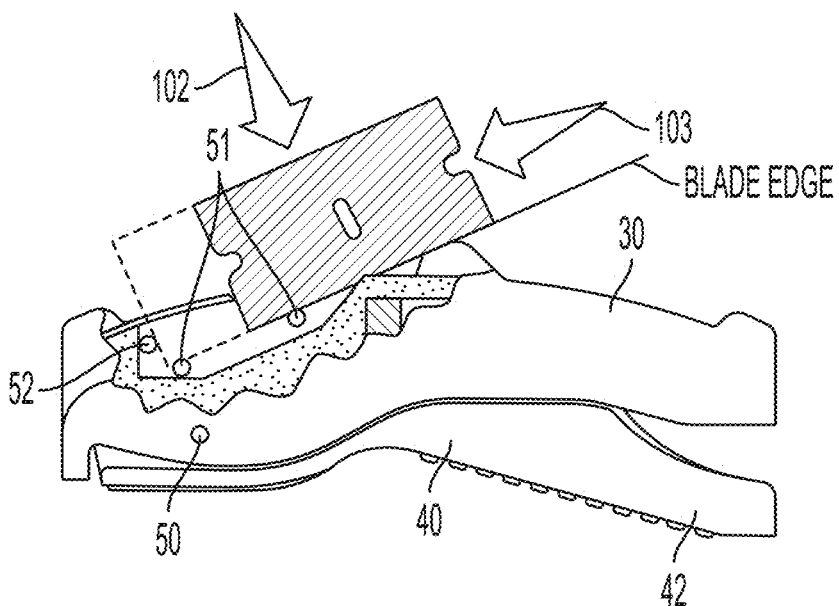
FIG. 20 is a right side elevational view of the blade being inserted into a working position on the rollable ribbon separator.
Figure 21:
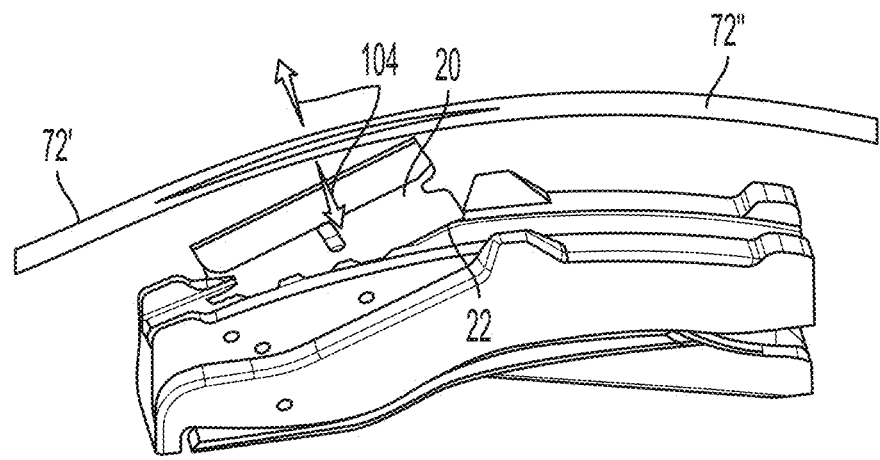
FIG. 21 is a right top perspective view of a rollable ribbon portion being positioned for separation on the rollable ribbon separator.
Figure 22:
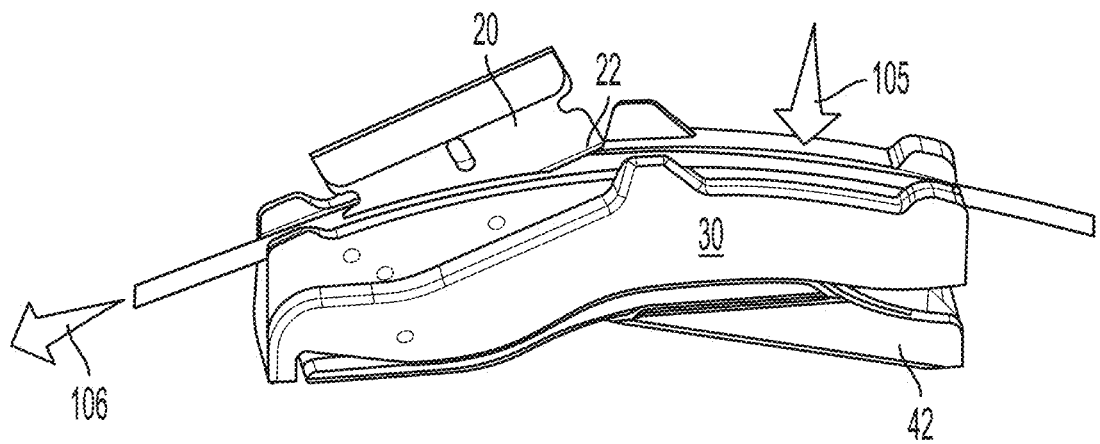
FIG. 22 is a right top perspective view of the rollable ribbon fibers being drawn through the rollable ribbon separator.

In a method of using the rollable ribbon separator 10, FIG. 18 shows the rollable ribbon separator 10 being opened by moving the handle 22 in the direction of arrow 100 to access the blade and FIG. 19 shows the blade 20 being released in the direction of arrow 101 from the storage compartment inside the rollable ribbon separator 10. FIG. 20 shows the blade 20 being positioned into a working position on the rollable ribbon separator 10 by inserting the blade 20 in the blade slot 46 on the chassis 30 in the directions of arrows 102, 103 until the blade cutting edge 22 contacts lower positioning pins 51 and the blade front edge 24 contacts front positioning pin 52. FIG. 21 shows a portion of a rollable ribbon being positioned for separation on the rollable ribbon separator by separating the fibers between nodes 72' and 72", straddling (arrows 104) the fibers 70' and 70" on the blade and positioning the fibers 70' and 70" against the guide with one fiber in each side of the blade for separation at node 72". FIG. 22 shows the rollable ribbon fibers being drawn through the rollable ribbon separator for separation. The user uses a thumb or finger in the direction and position of arrow 105 and draws the fibers in the direction of arrow 106 to separate the fibers at the node. The method includes inserting the blade 20 into the blade slot before selecting a first node for separation on the ribbon.

The rollable ribbon separator 10 includes a blade storage compartment and a handle assembly 40 including a handle 42, the handle assembly 40 rotatably secured to the chassis 30 wherein the blade storage compartment may store the blade 20 in the blade storage compartment 96, 97 (FIGS. 15 and 16) when the blade 20 is not in use and the blade is accessible by rotating the handle away from the chassis. The method includes a step of moving the handle away from the chassis until the stored blade is accessible and removing the blade from a storage compartment if the blade is not in the blade slot on the chassis before the step of selecting a first node for separation on the ribbon, the first node having an adjacent void.

The rollable ribbon separator includes a first magnet secured to the chassis and a second magnet secured to the handle assembly wherein the tool is biased in the closed position when the handle is in a first closed position and urging the handle to a second open position allows access to the blade storage compartment.

The guide surface 38 extends along an upper portion of the chassis 30 in the direction of the blade 20 to form an upper guide surface 38' (FIG. 6) beyond the blade cutting edge and provide an upper finger clamping region between protrusions 35. The rollable ribbon separator further including a lower finger clamping region 38" on a lower portion of the chassis opposite the upper finger clamping region, and the steps include a user's fingers grasping the upper and lower finger clamping regions and holding the ribbon in the flattened position against the guide surface while drawing the ribbon through the blade cutting edge. The arc of the guide surface 38 aids in ensuring that the ribbon fibers maintain contact with the guide surface, especially at the portion of the guide surface where the blade edge slices the bonded nodes 72.

The angle of the blade cutting edge with respect to the guide surface is between 20° and Alternately, the angle of the blade cutting edge with respect to the guide surface may be between 5° and 55°.

Figure 23:
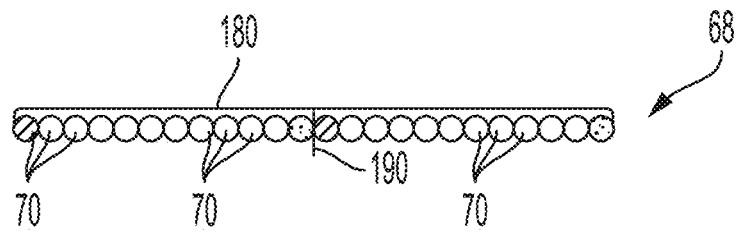
FIG. 23 is a cross-sectional view of a rollable ribbon in the flattened position showing the location of the fiber nodes in the rollable ribbon.
Figure 24:
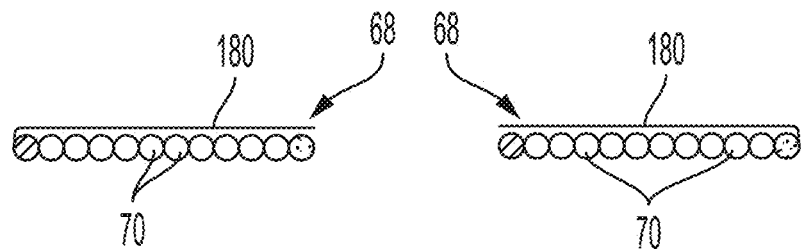
FIG. 24 is a cross-sectional view of the separated rollable ribbon shown in FIG. 23.
Figure 25:
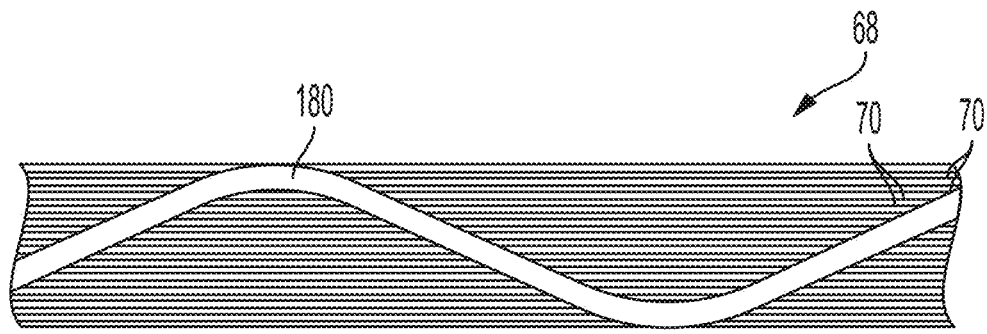
FIG. 25 is a top plan view of the rollable ribbon showing the node matrix on the rollable ribbon shown in FIG. 23.

FIG. 23 is a cross-sectional view of a rollable ribbon in the flattened position showing the location of the fiber nodes (shaded fibers) in the rollable ribbon 68. FIG. 24 is a cross-sectional view of the separated rollable ribbon 68 which has been separated at line 190 in FIG. 23. FIG. 25 is a top plan view of the rollable ribbon 68 showing the node matrix 180 along the rollable ribbon 68 surface. The node matrix 180 in FIG. 25 are the bonded node locations which generally do not extend straight across the rollable ribbon width. The angle of the blade to the guide surface 38 effectively lengthens the cutting area and minimizes the thickness of the blade, simulating a much thinner blade. The blade 20 slices through essentially all the bonding material (typically called MATRIX) fully before the blade creates too much wedging action since relying on wedging action may damage the coating. The bonding may be an adhesive. As manufacturers use greater strength adhesives, the separation of the fibers needs to be more precise since damage to the fibers becomes more of a concern. The smaller angle of the blade edge 22 to the guide surface produces the effect of increasing the distance the node travels against the blade edge before reaching the thicker portions of the blade beyond the cutting edge. The allows a greater portion of the node bond to be severed before the thicker portion of the blade separates the fibers.

Figure 26:
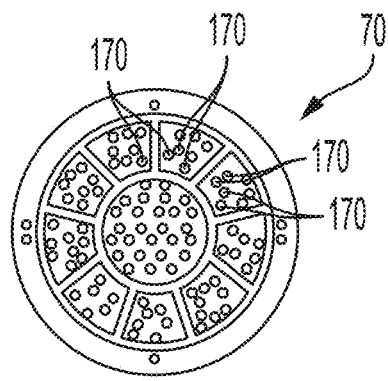
FIG. 26 is a cross-sectional view of a rollable ribbon fiber having a plurality of fiber optic strands.

FIG. 26 is a cross-sectional view of a rollable ribbon fiber 70 having a plurality of fiber optic strands 170. The number of fiber strands 170 in each fiber 70 may be in the hundreds or in the thousands.

Thus, the present invention provides one or more of the following advantages:
- providing a tool which creates a controlled method to load and separate the nodes of aggressively bonded fibers without damage;
- providing a tool which utilizes an angled blade and guiding support to allow a user to isolate a node and then separate that node and continue to separate multiples nodes within the selected fibers as needed; and
- providing a tool for separating aggressively bonded rollable ribbon fibers.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

The invention claimed is:

1. A tool for separating fibers in a rollable ribbon, the tool comprising:
    a chassis having a length and a guide surface along an external surface of the chassis length for receiving a first portion of a rollable ribbon in a flattened position, the guide surface for positioning the first portion of the rollable ribbon having a first node with selected fibers to be separated, the selected fibers being positioned flat on the guide surface; and
    a blade securable to the chassis, the blade having a blade cutting edge positioned toward the guide surface at an acute angle to the guide surface,
    wherein the external surface is exterior to the tool when the tool is in a closed position, and
    wherein the angle of the blade cutting edge with respect to the guide surface allows the cutting edge to urge the first portion of the flattened ribbon fibers against the guide surface when the fibers are drawn through the chassis along the guide surface.

2. The tool of claim 1 wherein the angle of the blade cutting edge with respect to the guide surface is between 20° and 40°.

3. The tool of claim 1 wherein the angle of the blade cutting edge with respect to the guide surface is between 5° and 55°.

4. The tool of claim 1 including blade storage compartment and a handle assembly including a handle, the handle assembly rotatably secured to the chassis wherein the blade storage compartment may store the blade in the blade storage compartment when the blade is not in use and the blade is accessible by rotating the handle away from the chassis.

5. The tool of claim 4 including a first magnet secured to the chassis and a second magnet secured to the handle assembly wherein the tool is biased in the closed position when the handle is in a first closed position and urging the handle to a second open position allows access to the blade storage compartment.

6. The tool of claim 1 wherein the blade cutting edge slices the nodes before the remaining portion of the blade separates the selected fibers adjacent the first node when the fibers are drawn through the chassis.

7. The tool of claim 1 including a blade slot in the chassis for securing the blade in a working position.

8. The tool of claim 1 including a plurality of blade guide pins for positioning the blade at the desired angle to the guide surface.

9. A method for separating fibers in a rollable ribbon comprising:
    providing the rollable ribbon separator including a chassis having a length and a guide surface along the chassis length for receiving a first portion of a rollable ribbon in a flattened position, the guide surface for positioning the first portion of the rollable ribbon having a first node with selected fibers to be separated, the selected fibers being positioned flat on the guide surface and a blade securable to the chassis, the blade having a cutting edge positioned toward the guide surface at an acute angle to the guide surface wherein the angle of the blade cutting edge with respect to the guide surface allows the cutting edge to urge the first portion of the flattened ribbon fibers against the guide surface when the fibers are drawn through the chassis along the guide surface;
    providing a rollable ribbon;
    selecting a first node for separation on the ribbon, the first node having an adjacent void;
    widening the adjacent void;
    draping the adjacent void over the blade;
    ensuring the first node is in contact with the guide surface;
    drawing the ribbon along the tool length until the first node contacts the blade edge; and
    continuing to draw the ribbon along the tool length until the fibers on the first node are separated.

10. The method according to claim 9 wherein the tool includes blade storage compartment and a handle assembly including a handle, the handle assembly rotatably secured to the chassis wherein the blade storage compartment may store the blade in the blade storage compartment when the blade is not in use and the blade is accessible by rotating the handle away from the chassis and the method includes a step of moving the handle away from the chassis until the stored blade is accessible and removing the blade from a storage compartment if the blade is not in the blade slot on the chassis before the step of selecting a first node for separation on the ribbon, the first node having an adjacent void.

11. The method according to claim 10 wherein the tool includes a first magnet secured to the chassis and a second magnet secured to the handle assembly wherein the tool is biased in the closed position when the handle is in a first closed position and urging the handle to a second open position allows access to the blade storage compartment.

12. The method of claim 10 including the step of inserting the blade into the blade slot before the step of selecting a first node for separation on the ribbon, the first node having an adjacent void.

13. The method according to claim 9 wherein the guide surface extends along an upper portion of the chassis in the direction of the blade to form an upper guide surface beyond the blade cutting edge and provide an upper finger clamping region, the tool further including a lower finger clamping region on a lower portion of the chassis opposite the upper finger clamping region, and the steps include a user's fingers grasping the upper and lower finger clamping regions and holding the ribbon in the flattened position against the guide surface while drawing the ribbon through the blade cutting edge.

14. The method of claim 9 wherein the angle of the blade cutting edge with respect to the guide surface is between 20° and 40°.

15. The method of claim 9 wherein the angle of the blade cutting edge with respect to the guide surface is between 5° and 55°.

16. The method of claim 9 including a plurality of blade guide pins for positioning the blade at the desired angle to the guide surface.

17. A tool for separating fibers in a rollable ribbon, the tool comprising:
- a chassis having a length and a guide surface along the chassis length for receiving a first portion of a rollable ribbon in a flattened position, the guide surface for positioning the first portion of the rollable ribbon having a first node with selected fibers to be separated, the selected fibers being positioned flat on the guide surface;
- a blade securable to the chassis, the blade having a cutting edge positioned toward the guide surface at an acute angle to the guide surface, wherein the angle of the blade cutting edge with respect to the guide surface allows the cutting edge to urge the first portion of the flattened ribbon fibers against the guide surface when the fibers are drawn through the chassis along the guide surface;
- a blade storage compartment and a handle assembly including a handle, the handle assembly rotatably secured to the chassis wherein the blade storage compartment may store the blade in the blade storage compartment when the blade is not in use and the blade is accessible by rotating the handle away from the chassis; and
- a first magnet secured to the chassis and a second magnet secured to the handle assembly wherein the tool is biased in the closed position when the handle is in a first closed position and urging the handle to a second open position allows access to the blade storage compartment.

* * * * *